(12) United States Patent
Poropat

(10) Patent No.: US 6,442,476 B1
(45) Date of Patent: *Aug. 27, 2002

(54) METHOD OF TRACKING AND SENSING POSITION OF OBJECTS

(75) Inventor: George Poropat, Queensland (AU)

(73) Assignee: Research Organisation, Campbell (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/689,741

(22) Filed: Oct. 13, 2000

Related U.S. Application Data

(63) Continuation of application No. PCT/AU99/00274, filed on Apr. 15, 1999.

(30) Foreign Application Priority Data

Apr. 15, 1998 (AU) .............................................. PP 2994

(51) Int. Cl.⁷ ................................................. G06F 7/00
(52) U.S. Cl. ...................................... 701/207; 701/300
(58) Field of Search ................................ 701/200, 201, 701/206, 207, 300

(56) References Cited

U.S. PATENT DOCUMENTS

| | | | | |
|---|---|---|---|---|
| 4,626,995 A | * | 12/1986 | Lofgren et al. ................ | 701/24 |
| 4,811,228 A | * | 3/1989 | Hyyppä ....................... | 701/25 |
| 4,831,539 A | * | 5/1989 | Hagenbuch .................. | 701/207 |
| 4,858,132 A | * | 8/1989 | Holmquist ................... | 701/28 |
| 4,937,751 A | | 6/1990 | Nimura et al. | |

(List continued on next page.)

FOREIGN PATENT DOCUMENTS

| | | |
|---|---|---|
| EP | 0 881 505 A1 | 12/1998 |
| GB | 2289389 | 11/1995 |

OTHER PUBLICATIONS

*Proc of SPIE*, vol. 2410, 1995, pp. 192–198, Cui et al., "Reconstructing and Visualizing Dense Global Visual Maps for Extended Passive Navigation".

Primary Examiner—William A. Cuchlinski, Jr.
Assistant Examiner—Edward Pipala
(74) Attorney, Agent, or Firm—Nixon & Vanderhye P.C.

(57) ABSTRACT

A spatial position and orientation sensor based on a three-dimensional imaging system provides information describing the actual three-dimensional spatial position relative to the sensor of objects in the field of view of the sensor. The sensor thus directly determines its location relative to its surroundings. Movement of the sensor, and thus movement of an object carrying the sensor, relative to the surroundings is detected by comparing repeated determinations of the location in three dimensions of fixed features in the surroundings relative to the sensor. An algorithm is used to calculate changes in the position of features in the field of view of the sensor relative to the sensor. Knowledge of changes in the position relative to fixed features is used to determine movement in three dimensions of the sensor or an object carrying the sensor relative to fixed features in the surroundings. The features in the surroundings may be natural or artificial. The true extent of the movement of the sensor in three dimensions is directly determined from the change in position and orientation of the sensor relative to the fixed features in the surroundings. The extent of the movement is used to determine the new position and orientation of the sensor relative to a previous position. When starting from a predetermined location the actual position and orientation of the sensor may be reliably tracked over a period of time by accumulating the measured movements over time.

10 Claims, 4 Drawing Sheets

U.S. PATENT DOCUMENTS

| | | | |
|---|---|---|---|
| 4,954,962 A | * 9/1990 | Evans, Jr. et al. | 701/28 |
| 5,005,128 A | 4/1991 | Robins et al. | |
| 5,051,906 A | * 9/1991 | Evans, Jr. et al. | 701/28 |
| 5,155,706 A | 10/1992 | Haley et al. | |
| 5,367,458 A | * 11/1994 | Roberts et al. | 701/25 |
| 5,467,273 A | 11/1995 | Faibish et al. | |
| 5,483,455 A | 1/1996 | Lay et al. | |
| 5,530,330 A | 6/1996 | Baiden et al. | |
| 5,758,298 A | 5/1998 | Guldner | |
| 5,838,262 A | 11/1998 | Kershner et al. | |

* cited by examiner

METHOD OF TRACKING AND SENSING POSITION OF OBJECTS

This application is a continuation of PCT/AU99/00274 filed Apr. 15, 1999.

TECHNICAL FIELD

The present invention relates to sensing and tracking the position of objects in an environment, particularly but not exclusively an environment where the features of the environment are not well controlled or predefined.

BACKGROUND ART

In order to undertake tasks in an environment that is known or unknown a priori, systems controlling machinery which must move in or through the environment, for example mining equipment, must have knowledge of the absolute or true position and orientation of the machinery in relation to the surroundings of the machinery. For some instances of controlled operation whereby elements of the control are exercised by a human operator and for autonomous operation, a control system must be equipped with a means to determine the absolute or true position and orientation of the machinery and the complete relationship of the machinery to the surroundings it is operating in.

The environment may be composed of natural or artificial features and may be complex thus possessing little or no regular structure. In addition, some features in the surroundings may be in motion relative to other features nearby.

Many methods have been disclosed, which enable a machine to navigate (determine its position and control its position) by using artificial features in a predetermined environment. For example, U.S. Pat. No. 4,831,539 to Hagenbuch discloses a system for identifying the location of a vehicle using distinctive signposts located at predefined positions. U.S. Pat. No. 4,811,228 to Hyyppa and U.S. Pat. No. 5,367,458 to Roberts utilise predefined target or signpost devices which are identified in some way by the vehicle to provide location information.

U.S. Pat. No. 5,051,906 to Evans, Jr., et al discloses an apparatus and method which provides for the determination of a vehicle's orientation and position in an environment, such as a hallway, from an image of a retroreflective ceiling feature.

These systems are inherently limited in their application by the requirement to determine the environment prior to operation of the machine and in many cases install artificial features which are used to determine the position of the machine within the defined environment. For example, it may be possible in a warehouse environment to provide a well controlled environment without unexpected features—however, this is much more difficult in a changing environment such as an open cut mine or underground mine, where the shape and location of objects are inherently in a state of change.

Other methods which enable a machine to navigate using inertial navigation systems have been disclosed. The operation of inertial navigation systems is usually based on assumptions about the reference frame—for example the rotation and revolution of the earth. Double integration of the acceleration determined by the navigation system often results in unacceptable drift in the calculated position determined by the inertial navigation system. Also, repeated changes in acceleration and repeated movement about a point tend to produce cumulative errors in inertial systems, as the next position assessment is based upon the previously determined value.

U.S. Pat. No. 4,626,995 to Lofgren et al discloses an arrangement in which a computer determines the Cartesian coordinates of a single light source through a camera attached to a vehicle. This arrangement requires that the height of the light source and the height of the sensor be predetermined. U.S. Pat. No. 4,858,132 to Holmquist discloses a system in which a computer determines the bearing of a composite light source through a camera attached to a vehicle, and from the apparent spacing between the elements of the lights determines bearing and range.

U.S. Pat. No. 5,483,455 discloses an arrangement in which targets located at predefined positions with respect to a base reference frame are detected and the position of a vehicle relative to the target determined. Location of the vehicle relative to the base reference frame is determined from the position of the vehicle relative to the known target.

It has been disclosed in the prior art that laser scanners may be used to determine position on a known path relative to a defined set of fixed reference points. In one embodiment, a laser or light transmitter scans a volume in which are located characteristic features consisting of reflectors intended to direct the emitted light back to a sensor located with the transmitter. The prior art also teaches the use of laser scanners to determine position relative to natural features and to memorise the position of such features in a two dimensional plane only in order to navigate between them.

It is also disclosed in the prior art to use scanning laser rangefinders to position equipment 2-dimensionally in a constrained environment such as a tunnel. Such techniques, known as wall following, are used for obstacle detection and the avoidance of collisions with fixed features such as walls and other obstacles. Such techniques may also be used to fuse data referenced to a known local environment with data from a dead reckoning system such as an inertial navigation system (INS) by periodically resetting the INS see "Experiments In Autonomous Underground Guidance", Scheding S., Nebot E., Stevens M., Durrant-Whyte H., Roberts J., Corke P., Cunningham J., Cook B; in IEEE Conference on Robotics and Automation, Albuquerque 1997.

In "An Experiment in Guidance and Navigation of an Autonomous Robot Vehicle", Bianche IEEE Transactions on Robotics and Automation, Vol 7 , No 2, April 1991, an experimental vehicle designed to operate autonomously within a structured office or factory environment is discussed. The disclosed device uses an odometry and steering angle based primary system, with a laser rangefinder used to correct this with respect to a predetermined 2-D map of the environment, and remotely generated path plans.

Methods have been disclosed also, which enable a machine to avoid collision with features in its environment, obstacle avoidance, that is, to determine its position and control its position relative to those features in such a manner as to avoid contact with the features. For example, U.S. Pat. No. 5,758,298 to Guldner discloses an autonomous navigation system for a mobile robot or manipulator. In the description of this patent all operations are performed on the local navigation level in the robot coordinate system. U.S. Pat. No. 4,954,962 to Evans, Jr., et al discloses a navigation control system of a robot which inputs data from a vision system and infers therefrom data relating to the configuration of the environment which lies in front of the robot so that the robot may navigate to a desired point without collision with obstacles or features in its environment.

Obstacle avoidance or collision avoidance systems are not required to determine and track the true position and orientation of the machine within the defined environment and therefore cannot be used for navigation and guidance except in the very local sense of avoiding collisions.

A plurality of methods have been disclosed involving the use of methods such as predetermined or installed reference points, stored maps of the local environment, infrastructure such as the Global Positioning System (GPS) or local radio navigation systems and systems such as inertial navigation systems. All of these methods use infrastructure which may be integral with the immediate environment or external to the immediate environment and must exist or be installed.

It is an object of the present invention to provide a location and navigation system which will enable a machine to operate over an extended area knowing its true location in that area which does not require the use of a predetermined reference frame or network of reference features, and is not reliant upon INS or GPS or similar sensing arrangements.

SUMMARY OF INVENTION

According to a first aspect, the present invention provides a method for determining the position of a movable object, including the steps of:

(a) initiating the process of determining the absolute or true position of said object in 3 dimensions when said object is at a known position in 3 dimensions (b) obtaining data indicative of the 3 dimensional location of one or more fixed features which may then be used as reference locations relative to said object via a sensing means, that is determining from said data the position in three dimensions of said one or more fixed features with respect to said object;

(c) moving said object;

(d) at the new position, obtaining data indicative of the new location in 3 dimensions of said one or more fixed features relative to said object via said sensing means, and determining from said data the displacement of said object with respect to said one or more fixed features;

(e) determining from said displacement of the object and said knowledge of the initial (or previous) position of the object the new position of the object in three dimensions;

(f) obtaining additional data indicative of the 3 dimensional location relative to said object of said fixed features or obtaining data indicative of extensions of said fixed features not previously visible to the sensors and (g) when possible or necessary i.e. if the object is moving out of view of previously known fixed reference features or when new fixed references are in view, obtaining data indicative of the 3 dimensional location of one or more new fixed features which may be used as new reference locations (which are different to the aforementioned ones) relative to said object via said sensing means, that is determining from said data the position of said one or more new fixed reference locations with respect to said object; and (h) repeating steps (c) to (g) as required until predefined conditions regarding the location of the object are fulfilled.

Conveniently, a 3-D imaging sensor, which provides measurements of the true relative position in 3-D space of objects relative to the sensor and may additionally provide measurements of the optical reflectance of objects in the field of view (such as is acquired in a camera image or seen with the eye) such optical reflectance being registered with the spatial information collected by the sensor, is mounted on the movable object with a predetermined (known) orientation and position thereon. The reference locations may form part of a natural feature such as a definite surface and/or define such feature, as well as artificial bodies with features defining a 3-D object.

According to another aspect, the present invention provides an autonomous vehicle, said vehicle including:

drive means for selectively moving said vehicle;

sensor means mounted at a known orientation and position on said vehicle, said sensor means providing 3-D imaging data representative of at least a selected volume about said vehicle;

processing means for receiving said sensor data, processing said sensor data in accordance with a predetermined instruction set so as to locate one or more fixed points, determining the position of said vehicle with respect to said fixed points in the selected volume, and so determine the position and orientation of said vehicle and generate control signals for said drive means.

The invention further includes apparatus enabled to implement the invention, and a system for controlling a set of autonomous vehicles using the inventive method.

The invention relates to a method for using knowledge of the position of the sensor, in three dimensions, relative to a known reference or fixed features to track the position of the sensor in three dimensions over a period of time. The sensor produces data in three dimensions which are measurements of the distance and bearing to objects in the field of regard of the sensor; that is the sensor is a 'three dimensional imaging system'. The data is used to determine the position of the sensor relative to fixed features in the surroundings of the sensor. Knowledge of the position of the sensor relative to a fixed object or objects in three dimensions completely determines the local position of the sensor. To measure movement, the position of the sensor relative to a fixed object or set of objects must be known in three dimensions at one time and must then be determined at a second time. The movement of the object is then determined directly from the difference between the two positions. Motion of the sensor may be tracked by successive determinations of the change in position of the sensor. The sensor may be mounted on equipment such as a vehicle or other machinery and used to track the movement of the equipment.

The movement of the sensor can be determined from changes in position relative to natural features or characterising features intended to provide specific reference points for guidance. The three dimensional spatial relationship of the sensor and features in the sensor environment is the key data used to track the sensor—not a predetermined map or an external reference system. Changes in position may be determined relative to a fixed point or a set of fixed points. The total movement of the sensor over a period of time can be determined by determining the position of the sensor at a succession of times. When starting from a known or predetermined position, the true position of the sensor at a specific time can be determined from knowledge of the starting position and knowledge of the movement of the sensor from the starting position up to that time.

A fixed object or a succession of fixed objects is used to determine the position of the moving sensor at successive times and the absolute position of the moving sensor relative to the known position from which it started may be determined at each of these times and the moving sensor thereby tracked. An object, for instance a vehicle, fitted with a three dimensional sensor system and a processing system to execute the algorithm can therefore track the position in three dimensions of the object carrying the sensor using knowledge of the starting position and knowledge of the movement in three dimensions. When fitted with a suitable three dimensional sensor and processing system the object can track its motion and determine its position relative to its starting point without requiring transmission of information to the object such as transmissions of radio waves as used in the Global Positioning System (GPS) or sensing elements of the motion of the object such as velocity or acceleration as used in inertial guidance systems. The three dimensional information acquired by the sensor consists of spatial measurements and embodies no scaling of the data. The representation of features therefore provides information as to the position and structure of objects in the field of view directly.

The invention described is a means of using knowledge of the three dimensional position relative to the surroundings to track the motion and thus navigate from a known starting position or relative to sensed features known to be fixed. The knowledge of the relative three dimensional position is obtained using a three dimensional imaging system.

The object may be, for example, an autonomous vehicle, wherein the location method described is used for navigation. The reference location may be predefined elements in whole or part where the environment is well defined. However, they may equally be determined by an instruction set (software) provided on the vehicle, according to some criteria to ensure the feature will be locatable after subsequent movement.

The sensing arrangement may be any suitable sensor which provides a direct indication of the absolute position or displacement of points relative to the sensor. As the arrangement of the sensor on the object is known, the sensing arrangement can also provide data about the orientation or attitude of the object, as the orientation of the reference feature will change with changes in the object orientation.

It will be appreciated that a key advantage of the inventive arrangement is that it does not require the environment to be fully defined or fitted with carefully plotted reference points. The inventive method simply selects suitable fixed features or parts of fixed features as reference points in transit. It does not rely on referencing to the predetermined location of the points, and so elaborate set up arrangements as are necessary in the prior art are not required.

It will be appreciated that the present invention includes a method of navigation, wherein location is sensed as above, and appropriate direction, acceleration and velocity decisions are made in accordance with software instructions. Many such proposals are described in the prior art—it is the underlying location scheme which is of key significance and difference to the prior art. In a navigation system, the vehicle will be provided with an intended destination or waypoint defined in three dimensions, conveniently relative to the start position or some agreed reference point.

The inventive arrangement may be used in conjunction with an INS or other positioning system to refine the position estimates and increase the accuracy or reliability of either means of estimating position. The inventive arrangement may be combined with or work with a collision avoidance or obstacle avoidance system to provide a plurality of functions.

Considering an environment such as a mine, the advantages of the present invention will become apparent. In a mine, the floor over which a vehicle travels is not uniform in smoothness, grade or surface composition. Any techniques that rely on assumptions about the operating surface being a plane will not be operative. Sensing based upon steer angle or wheel rotations will be inaccurate, and pot holes and wheel spins will alter the apparent distance travelled. Also, in a mine environment, the location in depth may be as important as the two dimensional location, and hence techniques reliant on range estimation based upon height of a target over a plane will be ineffective.

In an environment such as a mine, the shape of the environment alters on a regular basis, due to the nature of extraction of material from the environment. It is also an environment where extraneous features may be added, due to spillage, new working, etc. Hence, as the inventive arrangement does not require elaborate advance mapping, it is ideally suited to such an environment.

Whilst the prior art teaches to use a sequence of monocular (camera) images for the determination of motion, it does not teach the use of matching of features (which may be natural or artificial) in multiple three dimensional images in all three dimensions to determine the position and orientation of an object in the three dimensional space of the field of view of the sensor, which thus allows determining changes in the position of the sensor in three dimensions and tracking the actual position of the sensor.

Known means of determining position include devices such as ultrasound sensors or other range measurement devices or two dimensional imaging systems such as video cameras. These devices provide information in one or two dimensions directly. The acquisition of information in three dimensions requires data from more than one sensor and, in some cases, extensive computation of the data from a number of sensors. A three dimensional imaging system may be comprised of a combination of such sensors and processors or may be a special purpose three dimensional sensor such as a three dimensional laser range measurement scanning system. For example, two dimensional imaging systems only provide information on the angular relationships between features directly and provide no scale but may provide three dimensional information indirectly. To obtain three dimensional information using a two dimensional imaging system generally-requires a great deal of computation. Position determination is based on the measurement of position relative to a known reference such as terrestrial landmarks or stars or on the determination of movement from a known position as in an inertial navigation system. Position consists of three components. These may be x,y,z coordinates in a Cartesian reference frame or on the surface of the earth these may be latitude, longitude and elevation relative to the geoid. In many applications only one component of the position relative to the known reference can be determined. This component may be the bearing to the reference position as used in navigation from maps using triangulation or the distance to a reference as used in the Global Positioning System where the reference is a satellite in a known orbit. When only one component of relative position to a specified reference is known, complete determination of the position of an object requires the knowledge of this component for a number of reference positions. For example, when navigating by map and compass, two bearings are used to determine the position of the object. Three bearings are used to improve the accuracy of determination of the position of the object. When navigating by map and compass the combination of compass bearing and map provide the estimate of position in three dimensions. When all three components of position relative to a reference position are known, the position of an object is fully determined within some limits imposed by measurement error. A three dimensional imaging system provides knowledge of all three position components of objects in the field of view of the sensor and therefore fully determines the position relative to the sensor of an object in the field of view of the sensor.

BRIEF DESCRIPTION OF THE DRAWINGS

One embodiment of the present invention will now be described with reference to the accompanying drawings, in which:

FIGS. 5A, 5B illustrate a flow chart of the steps involved in the method of the present invention.

DETAILED DESCRIPTION OF THE PREFERRED EMBODIMENT

Whilst the operation of the invention is described with reference to a particular implementation, it will be appreciated that many alternative implementations are possible.

Figure 1:
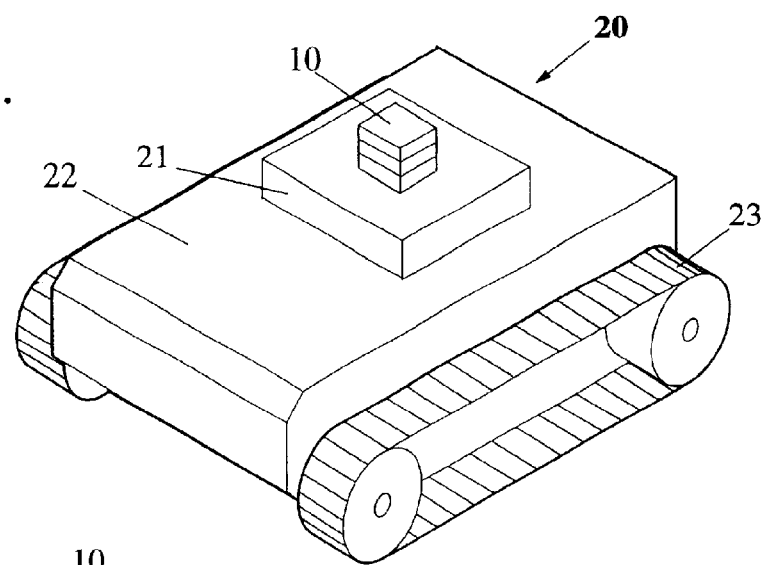
FIG. 1 is a representation of a vehicle and sensor in accordance with one aspect of the present invention.
Figure 2A:
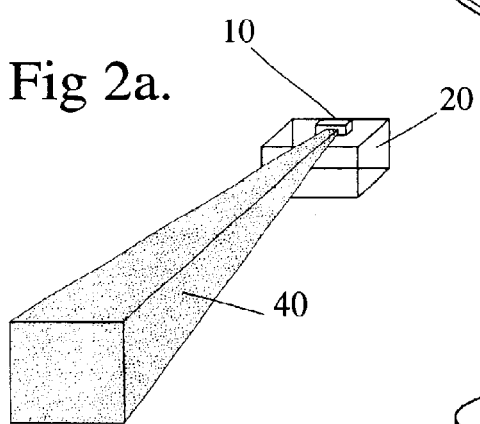
FIG. 2A is a representation of the sensor as it may be installed on a vehicle or other suitable object.
Figure 2B:
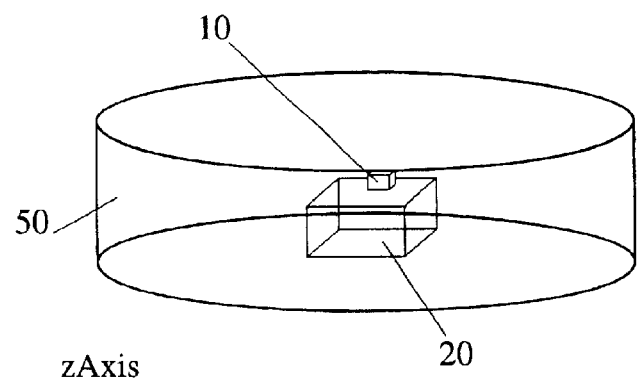
FIG. 2B describes the field of view of typical sensors in three dimensions.
Figure 3:
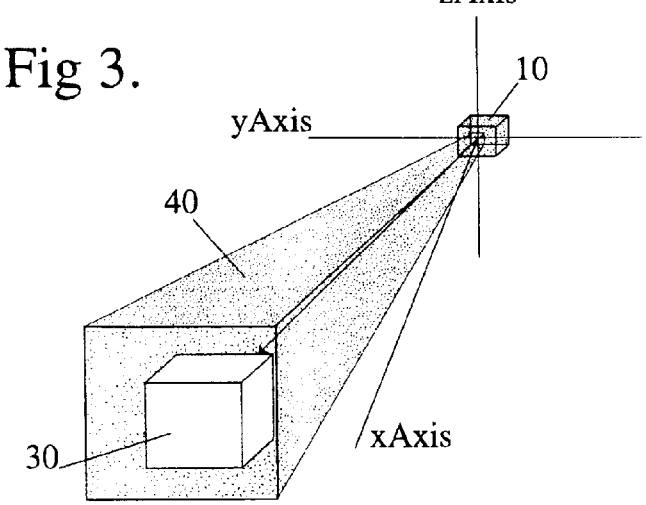
FIG. 3 illustrates how a suitable sensor system may determine its position at some time relative to a fixed object.

The operation of an illustrative tracking system is as follows. Typically, the sensor system includes a motorised vehicle (object) 20 as shown in FIG. 1, and a sensor 10 mounted atop the vehicle. In one embodiment, vehicle 20 has a main body 22 and tracks 23. In practice however, vehicle 20 may have any other configuration and means of locomotion. The sensor 10 will provide an image in three dimensions of any features 30 in the proximity of the vehicle. Determination of the position of the object 20 carrying the sensor 10 relative to any point on a fixed object 20 in the image is then readily performed. To determine motion of the object carrying the sensor it is not necessary to know the true position of any feature 30 in proximity to the object. It suffices that the features 30 recognised are fixed or do not move during the time the object 20 is moving (see FIGS. 3 and 4). In a sequence of two or more images, the positions in three dimensions of the object 20 carrying the sensor 10 relative to features 30 in the proximity of the object are determined for each image in the sequence. These positions thus provide measurement of the motion of the object carrying the sensor relative to the fixed objects in the proximity. As the object 20 carrying the sensor 10 moves, new fixed objects will enter the proximity of the sensor and can be used to provide an ongoing measurement of the motion of the object carrying the sensor. FIG. 2B provides a representation of object 20 and sensor 10, with the "field of view" of sensor 10 defined by volume 56. A data processing system 21 such as a computer is used to match like features in the three dimensional images. The identification of the position of a like feature relative to the sensor 10 is used to measure the displacement of the feature relative to the sensor. In use, three dimensional 'images' of a volume 40 containing the feature 30 are obtained at two separate times producing feature images 31 and 32. The images are compared and the displacement of the feature in the three dimensional image determined by identifying the displacement or offset 33 within the images at which the feature is determined to be positioned. In this manner the knowledge of three dimensional structure and the position of a sensor relative to the three dimensional structure is used to determine motion relative to a random set of fixed objects.

Figure 6A:
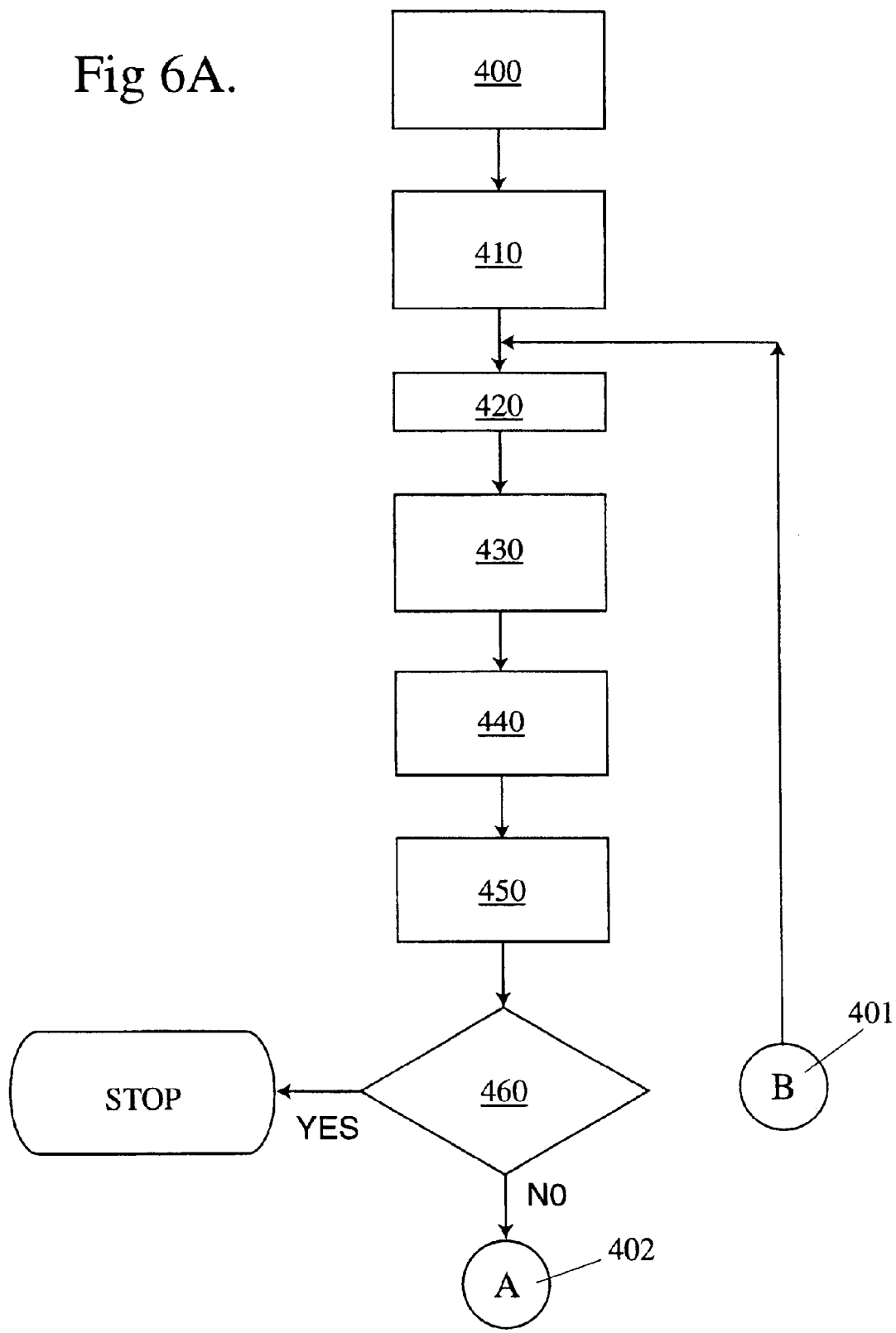
Figure 6B:
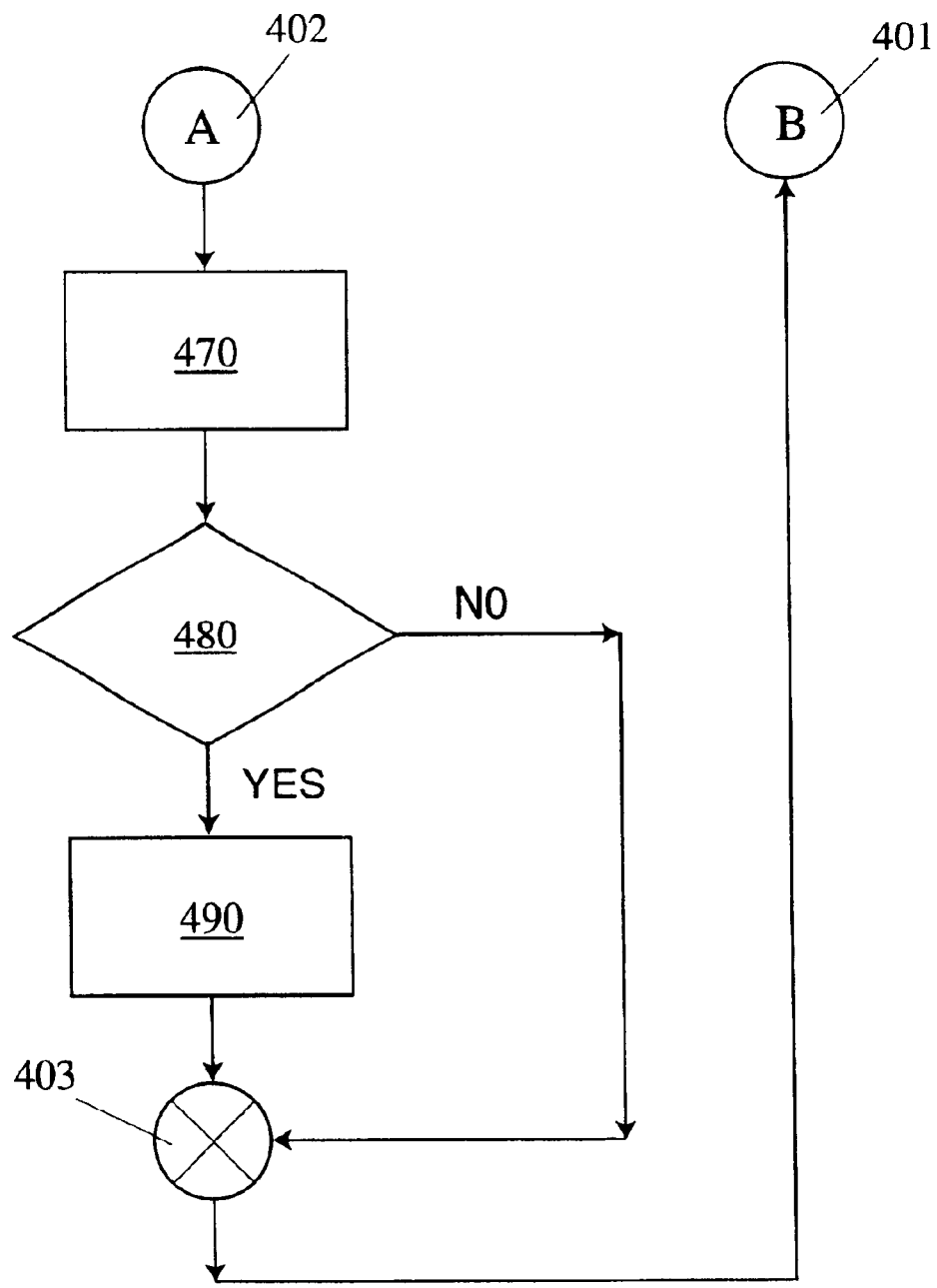

To determine the position relative to a feature in the three dimensional image, the feature 30 must be identified in the image. If the feature has an axis of symmetry, the determination of the change of position and orientation of the sensor relative to the feature will not be complete. To determine fully the orientation and position of the sensor relative to features which have symmetry, a number of features are required, for example, the orientation and position of the sensor relative to cylindrical poles requires that the sensor 10 see two poles to fully determine its position and orientation. In a sequence of two or more images the same feature or features must be recognised, (i.e. detected and identified) in each image and their positions and orientations relative to the sensor must be determined. A computer or digital signal processor 21 is used to process the data obtained by the sensor 10 and identify the features used to determine the positions of the object 20 in a sequence of images. A number of methods can be used to identify the features in images and match the features in different images. These methods include area based, edge based, feature based, model based and multilevel or hierarchical approaches and may be based on matching methods such as minimisation of least squares measures of disparity or determination of the degree of correlation between two features using devices intended to determine the degree of correlation (correlators). These methods may operate on spatial data alone or may operate on a combination of spatial and optical data as acquired by some types of 3-D imaging sensor. In the case of artificial features whose position is known, the true position of the vehicle 20 carrying the sensor 10 is fully determined from the three dimensional image data at any time that the sensor 10 can "see" the artificial feature. In the preferred embodiment, the process of tracking the moving object is shown in FIGS. 6A and 6B. At stage 400, the system is initiated by determining the position of object 20 in three dimensions, when the object is at a known position. This may be done for example by simply manually loading the known coordinates of the object's location into the processor. In step 410, the system obtains data, via sensor 10, indicative of the three-dimensional location of one or more fixed features 30. The processor 21 of object 20 then processes the obtained data to determine the three-dimensional position of object 20 relative to the fixed feature or features 30. In step 420, object 20 moves to a new location. Step 430 involves obtaining new data indicative of the new three-dimensional location(s) of the known fixed feature(s) 30 relative to object 20. Using this data in step 440, the processor 21 then determines the displacement of object 20 in three-dimensions, from the previously known location. The actual three-dimensional coordinates for the new location of the object can then be determined in step 450 from the knowledge of the coordinates of the previous location and the displacement calculated above.

In step 460, processor 21 checks to see if certain predetermined conditions have been satisfied. For example, a predetermined condition may be a destination location. If the conditions are satisfied (e.g. object 20 has reached its destination), processor 21 generates control signals causing object 20 to stop. If the conditions are not satisfied, the process continues to element 402 which proceeds to step 470 in FIG. 6B.

At step 470, sensor 10 obtains additional data indicative of the new three-dimensional locations of the known fixed reference features. Note that this step need not be undertaken if the data obtained in step 430 is still suitable for use. For example, if the feature or features used in step 430 may not be visible from the new location of object 20 once it has moved again, then step 470 is undertaken to select new and more appropriate reference points. The reference point chosen need not be a new structure. It may be a more visible feature of the existing structure, or an extension of the existing structure.

In step 480, processor 21 may also elect to obtain data of new features or structures which have come into view since object 20 moved. If this step is selected, then appropriate data indicative of the three-dimensional location of the new feature relative to object 20 is obtained via sensor 10, at step 490.

If step 480 results in a negative, i.e. there are no new features visible, then processor 21 skips ahead to junction element 403, omitting step 490.

From element 403, processor 21 proceeds to element 401 to loop back to step 420 in FIG. 6A to move object 20 and repeat the sequence. This loop is repeated until the predetermined conditions are satisfied in step 460, and object 20 stops.

Sensor 10 and processor 21 may be used to determine the relationship between objects and estimate the position of the object carrying the sensor in a number of ways based on this simple process. For example multiple objects may be used. Objects in the sensor field of view may be compared to determine the relationship of these objects relative to each other and thus determine whether they are moving relative to each other and eliminate moving objects from the estimation of position.

Figure 4:
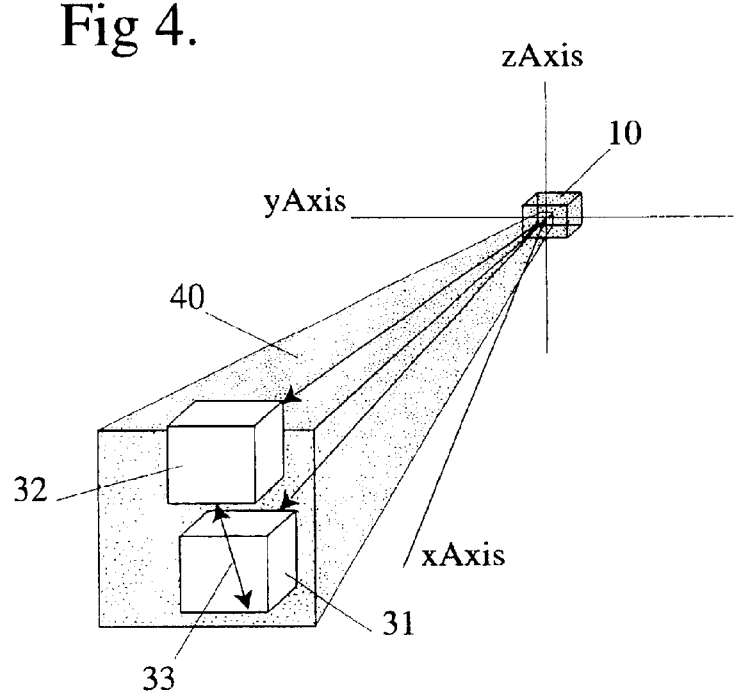
FIG. 4 illustrates how the sensor may determine its position relative to the fixed object at a later time and how the movement of the sensor and thus the object carrying the sensor is determined from the measurement of position at the two separate times.
Figure 5:
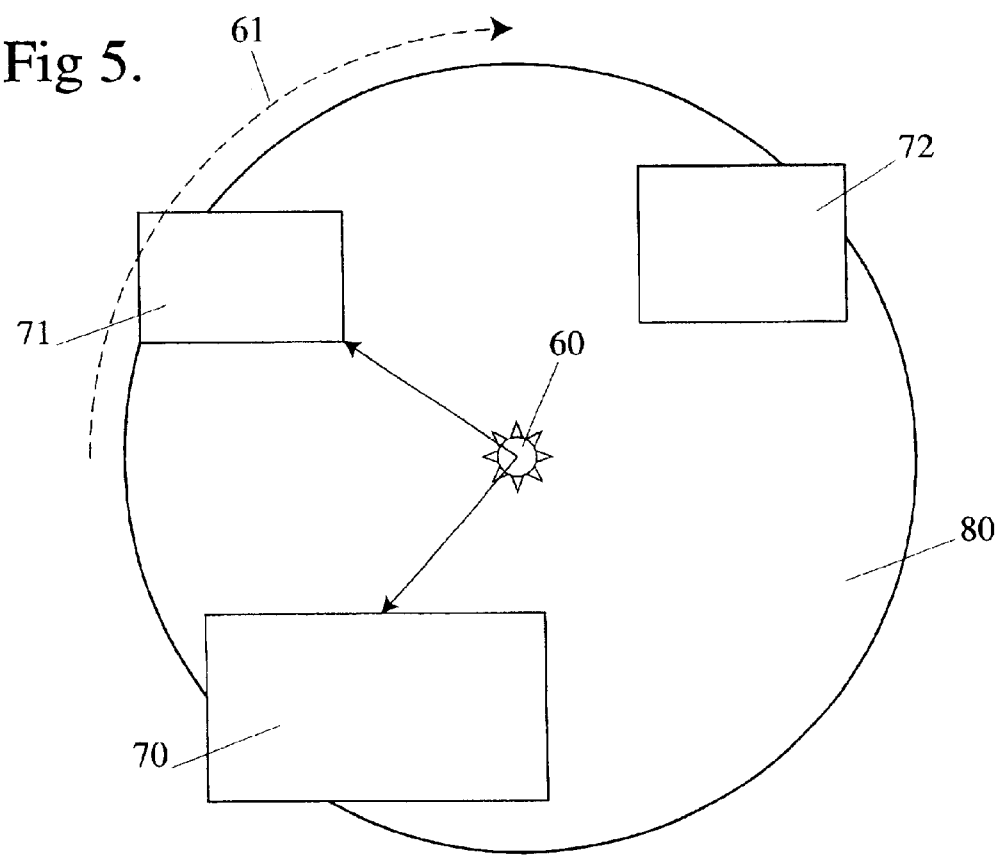
FIG. 5 illustrates operation of the sensor in two dimensions to determine 2-dimensional position in a plane.

A simpler implementation may be realised by the use of a spatial position and orientation sensor 60 which acquires information describing the actual spatial position relative to the sensor of objects 70, 71, 72 in the field of view of the sensor in two dimensions (see FIG. 5). In this implementation, sensor 60 acquires spatial data in a plane 80 and the position of the sensor relative to features 70, 71, 72 in the environment is determined within the plane of measurement. Movement relative to features in the environment is then characterised by changes in position within the plane of measurement, for example the surface of the sea or ocean in the case of a surface vessel. The method for estimating motion in two dimensions is analogous to the method used to estimate motion in three dimensions described previously but eliminates the use of the spatial position component which is not contained by the plane of measurement. The sensor 60 may be a laser range measurement system such as a laser rangefinder or a radar system which is rotated (61) and used repetitively so as to measure the range(s) to features in the plane of rotation. Knowledge of the direction in which the rangefinder is oriented at the time at which a range is measured then completely determines the position of a feature in the plane of measurement. FIG. 4 illustrates the operation of the invention in two dimensions.

A key aspect of the present invention is the use of the characteristics of a true 3-D image to navigate. Two dimensional data such as position in a plane determined by a laser scanner, angular position such as determined by an imaging system, one dimensional data such as range or bearing and single point three dimensional data such as range combined with azimuth and elevation and bearing to a single point can not be used to navigate in three dimensions.

When three dimensional data is acquired from a sensor the position of the sensor in the object space is completely determined and this thus differentiates a three dimensional sensor system from one and two dimensional sensors which must be used in conjunction with additional knowledge such as knowledge of a map or other sensors to determine the position of the sensor. With a three dimensional system, changes in the position of the sensor can be readily tracked in three dimensions and knowledge of the true position of the sensor maintained. If the sensor is mounted on an object such as a vehicle and the position of the sensor on the vehicle known and the orientation of the sensor relative to the vehicle known then the position of the vehicle is known and can be tracked. The tracking can be performed in three dimensions without the use of artificial features or the requirement to know the position of selected artificial or natural features.

The present implementation is discussed primarily with reference to the use of laser based range measurement implementations. However, numerous alternative 3-D imaging systems may be used to implement the inventive concept, some of which are discussed briefly below.

Alternative Methods of Producing 3-D Images

Two primary methods are employed for 3-D imaging:

measurement of range and orientation to a plurality of points including scanning range measurement devices, and triangulation to a plurality of points.

In addition 3-D images may be produced by:
Range gated imaging
Moire techniques
Holographic interferometry
Adaptive focussing systems
Estimation of range from image defocus
Each of these will be discussed below.

Scanning Range Measurement Devices

Three dimensional images are acquired using scanning range measurement devices by recording the range to points in the object space at which the range measurement device is directed. When the range measurement device is scanned over the object space and the range recorded over a grid of points for which the position and orientation of the sensor is known, a range map is produced which is then readily converted to a three dimensional image. The use of a laser range finder scanned over an object space to produce a three dimensional image has been demonstrated many times. Ultrasonic or radar range finders can be used to generate similar images.

Triangulation Systems

Triangulation systems require that we have two components of the sensor which each allow us to determine the direction in three dimensions to a point in the object space. The position and orientation of each component of the sensor is known and, since for each component of the sensor the angular direction to the point is known, the position in space of the point is readily determined thus providing a three dimensional image. Triangulation may be subdivided into techniques: passive triangulation and active triangulation.

Passive triangulation encompasses such techniques as aerial or terrestrial photogrammetry where the components of the measurement system are two or more cameras, or one camera taking two or more images. Points in each image are matched and from the position in each image of the matched points the spatial position is determined. Fast systems using two television cameras and image processing systems are sometimes classified as stereo vision.

Active triangulation encompassed such techniques as structured light imaging where a light stripe is projected into an object space and viewed by a camera or similar sensor from another position. In some instances two cameras are used. Knowledge of the direction of projection of the light stripe and the position and orientation of the camera or cameras enables calculation of the position in space of any point reflecting the light. Another form of active triangulation involves the use of a spot of light scanned over the object space.

Range Gated Imaging

Range gated imaging is achieved by obtaining a series of images of a scene which is illuminated with a controlled light source. The light source has an extremely short duration and is turned on and off. Each time that the light source is turned on an image of the scene is obtained for an extremely short time after a variable delay. Those features in the scene which reflect light during this period and are therefore at a known range from the camera thus produce an image. By acquiring a series of images of this form a range map of the scene is obtained. The position and orientation of the sensor is known and, since for each image the angular direction of the features is known, the range map is then converted to a three dimensional image.

Moire Techniques

A Moire pattern is an interference pattern of low spatial frequency. The interference pattern is projected into the object space and surface depth information is encoded in and recovered from the phase information embodied in the observed interference pattern in the object space.

Holography

Holographic interferometers use coherent radiation to produce interference patterns. When optical radiation is used, a photodetector is used to detect the reflected radiation and the three dimensional image is constructed from the structure of the interference pattern. Interferometry may be performed with radiation of wavelengths typically used for radar systems.

Adaptive Focussing

The optical configuration required to achieve focus of an imaging system can be used to infer the range to a feature in the object space. By varying the focus and recording the focus conditions, e.g. the optical configuration required to achieve focus, when a feature is in focus the range to features in the object space is mapped. This data is treated similarly to the range and image data in a range gated imaging system to produce a three dimensional image.

Estimation of Range from Image Defocus

The degree of defocus of an imaging system can be used to infer the range to a feature in the object space. The estimation of the range to an object is achieved by modelling the effect that the optical configuration of a camera, namely the range at which best focus is achieved, has on images acquired with a small depth of field. Range information is recovered from defocused images by calculating the range of various points in an image by estimating the degree of defocus at the said points. These methods are discussed, for example in, Rajagopalan A. N., Chaudhuri Space Variant Approaches To Recovery of Depth From Defocused Images; Computer Vision and Image Understanding Vol 68, No 2, December 1997.

Obviously other alternative 3-D imaging techniques can be employed to implement the present invention. For example, as discussed in Besl, P. J., Active Optical Range Imaging Sensors; Machine Vision and Applications Vol 1 1988.

It will be appreciated that the invention has been described in terms of a preferred embodiment. Many variations and modifications are possible within the scope of the present invention as defined by the following claims.

What is claimed is:

1. A method for determining the position of a movable object, including the steps of:

(a) initiating the method when said object is at an initial known location in three-dimensions;

(b) obtaining data indicative of the three-dimensional location relative to said object of one or more fixed reference features by way of one or more sensors associated with said object to determine the displacement of said object from said reference feature(s);

(c) moving said object to a new object location;

(d) at the new object location, obtaining new data indicative of the new location of said fixed reference feature or features relative to said object via said sensor(s);

(e) determining from said new data, the displacement of said object relative to said fixed feature or features;

(f) determining from said displacement of said object and knowledge of said initial known location, the new three-dimensional location of said object;

(g) if the object is moving out of view of said fixed reference feature(s), and/or when a new fixed reference feature or features come into view, obtaining data via said sensor(s) indicative of the three-dimensional location of said new fixed feature or features which may be used as new reference locations relative to said object; and h) repeating steps (c) to (g) as required until predetermined conditions are fulfilled.

2. A method according to claim 1, including, between the steps of (f) and (g), obtaining additional data indicative of the three-dimensional location of the fixed feature(s), or of extensions of said fixed feature(s) if the new data obtained in step (d) is no longer suitable for use as reference data.

3. A method according to claim 2, wherein the data indicative of three-dimensional location of said one or more reference features includes optical reflectance data.

4. A method according to claim 1, wherein said data indicative of three-dimensional location of said one or more reference features includes optical reflectance data.

5. A method according to claim 4, wherein said fixed feature or features form part of a natural feature and/or an artificial feature defining a three-dimensional object.

6. A method according to claim 4, wherein the fixed feature or features form part of a natural feature and/or an artificial feature defining a three-dimensional object.

7. A vehicle including:

drive means for propelling the vehicle along a path;

one or more sensors mounted at a known orientation and position on said vehicle, said one or more sensors providing three-dimensional data representative of at least a selected volume about said vehicle;

processing means for processing data received from said one or more sensors to determine:

the location of one or more stationary points which are used as local temporary reference points, said determination of location not requiring a priori knowledge relating to the location of the said one or more stationary points;

the displacement of said vehicle relative to said one or more stationary points;

the location of said vehicle, having knowledge of a previously known or determined vehicle location in three dimensions and the determined displacement of said vehicle, where said previously determined vehicle location is calculated from a knowledge of a location previous to that, and from a determination of the displacement of said vehicle relative to a previous one or more stationary point.

8. A vehicle according to claim 7, wherein said processing means also generates control signals for said drive means.

9. A vehicle including:

a driver for propelling the vehicle along a path;

one or more sensors mounted at a known orientation and position on the vehicle, providing three-dimensional data representative of at least a selected volume about the vehicle;

a processor for processing data received from the one or more sensors to determine:

the location of one or more stationary points which are used as local temporary reference points, the determination of location not requiring any a priori knowledge relating to the location of the one or more stationary points;

the displacement of the vehicle relative to the one or more stationary points;

the location of the vehicle, having knowledge of a previously known or determined vehicle location in three-dimensions and the determined displacement of the vehicle, wherein the previously determined vehicle location is calculated from a knowledge of a prior location, and a determination of the displacement of the vehicle relative to a previous one or more stationary point.

10. A vehicle according to claim 9, wherein the processor is configured to generate control signals for the driver.

\* \* \* \* \*

UNITED STATES PATENT AND TRADEMARK OFFICE
CERTIFICATE OF CORRECTION

PATENT NO. : 6,442,476 B1 Page 1 of 1
DATED : August 27, 2002
INVENTOR(S) : Georg Poropat It is certified that error appears in the above-identified patent and that said Letters Patent is hereby corrected as shown below:

<u>Title page,</u>
Item [73], please change the assignee to read as follows:

-- Commonwealth Scientific and Industrial Research Organisation --

Signed and Sealed this

Second Day of September, 2003

JAMES E. ROGAN
*Director of the United States Patent and Trademark Office*